Sept. 4, 1956 J. S. KILBY 2,762,001

FUSED JUNCTION TRANSISTOR ASSEMBLIES

Filed March 23, 1955

INVENTOR:

Jack S. Kilby by John W. Michael

Attorney 2,762,001
Patented Sept. 4, 1956

2,762,001

FUSED JUNCTION TRANSISTOR ASSEMBLIES

Jack S. Kilby, Milwaukee, Wis., assignor to Globe-Union Inc., Milwaukee, Wis., a corporation of Delaware Application March 23, 1955, Serial No. 496,144
6 Claims. (Cl. 317—235)

This invention relates to improvements in fused junction transistor assemblies.

A diffused wafer of germanium with its emitter, base, and collector dots is so small (the wafer is 0.075" x 0.115" x 0.005") that the positioning and soldering of small lead wires (0.005" wire) to the emitter and collector dots with low melting point solder can be accomplished only with great care and skill and under a microscope.

It is an object of this invention, therefore, to provide a mechanically strong unusually small assembly in which the parts are easily positioned and soldered using mass production methods without the use of skill and care.

In obtaining this invention there is provided an insulating base in which terminals are contained as inserts with exposed parts in confined recesses. This base has a seat for receiving a germanium wafer so that the dots on one side thereof are spacedly positioned in said recesses in engagement with preforms of low melting point solder therein. The base is seated in a metal cup which has a tinned tab and a terminal attached thereto. This tab is bent over the base and pressed against the dot on the other side of the wafer. The tab is temporarily held under tension by frictionally engaging an opposite side of such cup. The assembly is then heated until the solder melts fusing all connections. With this arrangement there are no loose parts which must be separately held in proper position during soldering. No skill is required to prevent melting of the dots on the wafer. The base and cup act as jigs to hold all the terminals in proper place under compression so that the soldering (simple heating) can be done on mass production basis under strict temperature control to make a mechanically strong unusually small assembly.

Figures 1, 2, 3, 4:
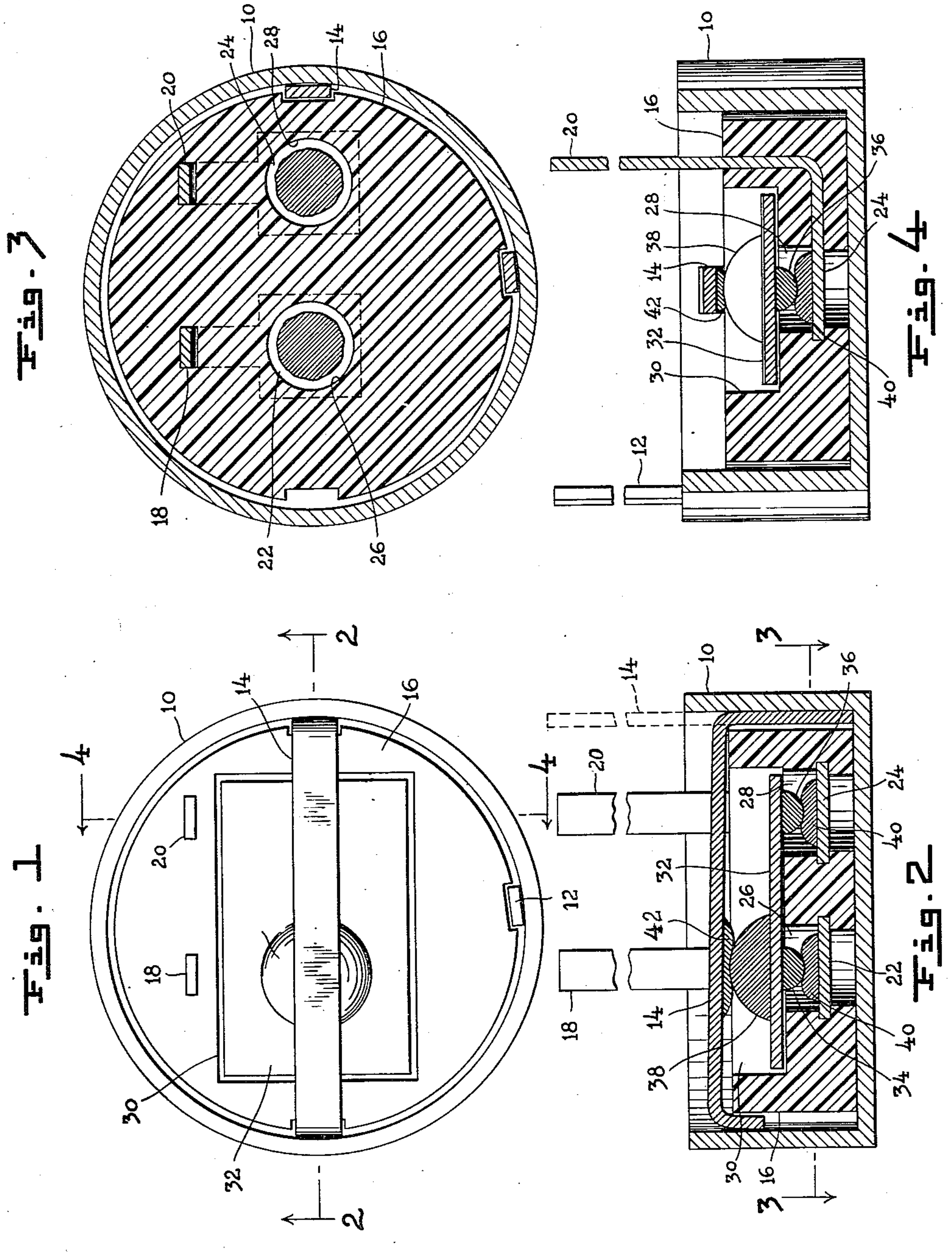
Fig. 1 is a top plan view of a fused junction transistor assembly embodying the present invention.
Fig. 2 is a sectional view taken on the line 2—2 of Fig. 1.
Fig. 3 is a sectional view taken on the line 3—3 of Fig. 2.
Fig. 4 is a sectional view taken on the line 4—4 of Fig. 1.

The transistor assembly shown in the drawing is extremely small, the drawing being enlarged to approximately twenty times the actual size. The germanium wafer of the transistor is made in accordance with conventional and well known methods not forming a part of this invention. The only departure from conventional structure is the use of dot in place of the conventional tab for the base connection.

The assembly consists of a metal cup or can 10 which is open at the top. The cup 10 has secured to it an upstanding collector terminal 12 which in the complete assembly constitutes the connection for the collector. A temporarily upright tinned tab or holding member 14 is also secured to the cup 10. This tab forms an anchor for the assembly as well as a conductor connecting the collector dot to the cup 10 and collector terminal 12. The terminal 12 and tab 14 may be welded to the inner walls of the cup 10 or otherwise rigidly secured thereto. Except for the additional expense of manufacture they may be made as integral extensions of the wall of such cup. It is also feasible that the member 14 be assembled after the base member, in which case both its ends will be fused to the cup in the subsequent heating of the unit.

An insulating base or block 16 formed so as to fit within the cup 10 is moulded from a thermosetting plastic compound formulated with urea- and melamine-formaldehyde resins, wood pulp, pigments, mould lubricants and plasticizing agents, sold under the trade name of Plaskon by Libby-Owens-Ford Glass Company, Plaskon Division. The base 16 has an emitter terminal 18 and a base terminal 20 moulded therein as inserts. These terminals project upwardly from the top of the base 16 and their embedded parts have exposed portions or areas 22 and 24 respectively in solder receiving recesses 26 and 28 opening to a wafer receiving seat 30 in the top of the base 16. The exposed portions 22 and 24 may be seated on pins in the mould during the moulding process to properly center and hold the terminals during moulding. Such pins will form cavities in the base 16 beneath such exposed portions. These cavities are not harmful and in some respects may assist in the easy heating of the preforms of solder.

The fused transistor consists of a germanium wafer 32 of rectangular shape, on the lower surface of which are an emitter dot 34 and a base dot 36. On the upper side of the wafer 32, there is a collector dot 38. The collector dot is larger than the emitter and base dots and is positioned opposite the emitter dot. All of these dots are fused in the well-known manner and are made of metal such as indium or other metal which will have a melting point greater than the melting point of low melting temperature solder. The physical dimensions of the wafer 32 are such that when placed in the seat 30, such seat will position the emitter dot 34 and base dot 36 spacedly in the respective recesses 26 and 28. The recesses 26 and 28 are deep enough to receive preformed pellets of solder which will be contacted by the dots 34 and 36 when the wafer 32 is seated in the seat 30. The top of the collector dot 38 in such case will extend slightly above the top of the base 16.

In the manufacture of the transistor assembly, the base 16 is inserted in the cup 10 and pellets 40 of low melting temperature solder are dropped in the recesses 26 and 28 in contact with the exposed areas 22 and 24. The wafer 32 is then placed in the seat 30 with the dots 34 and 36 resting on the pellets 40. The tinned tab 14 is then bent over the top of the base 16 with its outer downturned end frictionally engaging the wall of the cup 10. Enough pressure is placed on the tab 14 to insure compression engagement between the dots and the pellets and the collector dot and the tinned tab. The entire unit (with others in mass production methods) is then heated to a temperature at which the low melting solder pellets and the tinning on the tab 14 will melt and fuse the dots 34 and 36 to the exposed areas 22 and 24, the dot 38 to the tab 14 and the end (or both ends) of the tab 14 to the wall of the cup 10. This makes these all three electrical connections as well as the mechanical connections in one operation. The result is a mechanically strong unit with soldered joints formed under compression. The base 16 acts as a jig to properly locate the dots 34 and 36 with respect to the terminals 18 and 20 and the cup 10 and tinned member 14 hold the parts so assembled. Hence, there is no necessity for care and skill in assembling and handling. The unit prior to heating may be easily grouped with other units for the final fusing of the assembly. It is not necessary to solder all points simultaneously. Separate pressure can be placed on the wafer 32 and the pellets 40 fused by application of heat. Then the tinned tab 14 may be bent over the base 16 in contact with the dot 38 and fused to form a connection at 42.

When the emitter dot 34 is made of tin and the base dot 36 and collector dot 38 made of indium, it is not necessary that low melting point solder be used to tin the tab 14 or for the pellet under the dot 34. Regular lead tin solder may be used for such tinning and pellet while the pellet under the base dot 36 is made of indium. This will make somewhat stronger connections. The upwardly extending terminals 12, 18 and 20 may be used as leads for connecting the transistor assembly to other components of a printed circuit. The method of mounting the transistor assembly in the ceramic base plate of a printed circuit is disclosed and claimed in a separate application of Jacfl S. Kilby, applicant herein, and Le Roy E. Dilger, Serial No. 480,686, "Component Mounting for Printed Circuits." If, in accordance with the teachings of that application, the assembly is to be hermetically sealed in such ceramic base plate, it is not necessary to cover the opening of the cup 10. However, if the assembly is not to be so sealed, it may be advisable to fill in the opening of the cup 10 with an encapsulating resin or wax.

I claim:

1. A transistor assembly including a metal container having a tinned tab and a terminal, an insulating base in said container having recesses and a seat, terminals rigidly fixed in said base and having exposed portions in said recesses, a germanium wafer in said seat having dots on one side in said recesses, solder in said recesses fused with said exposed portions and dots, and a dot on the other side of said wafer, said tinned tab being in pressure engagement with and fused to said last named dot.

2. A transistor as claimed in claim 1 in which said solder in said recesses and tinning on said tab are simultaneously fused.

3. In a transistor assembly: a germanium wafer having collector, emitter, and base dots; and an insulating member having terminals rigidly secured thereto, and a wafer alining surface; said terminals having exposed portions accessible from said surface; said wafer being positioned by said surface with said dots in fused connection with said exposed portions.

4. In a transistor assembly, a base member for holding a fused germanium wafer with dots for simultaneously soldering said dots to terminals without use of skilled manual dexterity comprising, a block of moulded plastic insulating material, said block having a wafer receiving seat, openings leading from said seat adapted to receive dots on said wafer, terminals moulded in said block and having exposed portions in said openings, said exposed portions being spaced from said seat so that pellets of solder in said openings in engagement with said portion will be engaged by dots in said openings when said wafer is in said seat.

5. In a transistor assembly, a metallic open ended cup having a collector terminal projecting from said open end, an insulating base fitted in said cup, said base having a wafer holding portion, solder receiving recesses in said base adjacent said holding portion, a base terminal and an emitter terminal mounted in said insulating base, said terminals having areas in said solder receiving recesses, solder in said recesses in contact with said areas, a germanium wafer in said holding portion having an emitter dot in one of said recesses in contact with said solder and a base dot in the other of said recesses in contact with said solder, said wafer having a collector dot exposed to said open end, and a tinned metallic member having its ends in tight engagement with said cup and its intermediate portion in pressure contact with said collector dot whereby said assembly is maintained in condition for handling and heating to simultaneously fuse the connections between said base and emitter dots and said terminals, the connections between said collector dot and said tinned member and said tinned member and said cup.

6. In a transistor assembly, a metallic open ended cup having a collector terminal projecting from said open end, an insulating base fitted in said cup, said base having a wafer holding portion, recesses in said base adjacent said holding portion, a base terminal and an emitter terminal mounted in said insulating base, said terminals having areas in said recesses, a germanium wafer in said holding portion having an emitter dot in one of said recesses fused to said area of said emitter terminal and a base dot in the other of said recesses fused to said area of said base terminal, said wafer having a collector dot exposed to said open end, and a tinned metallic member having its ends fused to said cup and its intermediate portion in pressure contact with and fused to said collector dot.

References Cited in the file of this patent

UNITED STATES PATENTS

| | | |
|---|---|---|
| 2,644,852 | Dunlap | July 7, 1953 |
| 2,665,399 | Lingel | Jan. 5, 1954 |
| 2,733,390 | Scanlon | Jan. 31, 1956 |
| 2,734,154 | Pankove | Feb. 7, 1956 |

FOREIGN PATENTS

| | | |
|---|---|---|
| 1,048,471 | France | Aug. 5, 1953 |
| 1,080,034 | France | May 26, 1954 |